Sept. 29, 1959     W. P. OEHLER ET AL     2,906,436
HOPPER MOUNTING FOR FERTILIZER DISTRIBUTOR
Filed Dec. 31, 1956     3 Sheets-Sheet 2

INVENTORS.
WILLIAM P. OEHLER
HAROLD V. HANSEN
ATTORNEYS

Sept. 29, 1959 W. P. OEHLER ET AL 2,906,436
HOPPER MOUNTING FOR FERTILIZER DISTRIBUTOR
Filed Dec. 31, 1956 3 Sheets-Sheet 3

INVENTORS.
WILLIAM P. OEHLER
HAROLD V. HANSEN
BY
ATTORNEYS

United States Patent Office 2,906,436
Patented Sept. 29, 1959

2,906,436
HOPPER MOUNTING FOR FERTILIZER DISTRIBUTOR

William P. Oehler, Moline, and Harold V. Hansen, Hillsdale, Ill., assignors, by mesne assignments, to Deere & Company, a corporation of Delaware Application December 31, 1956, Serial No. 631,588

5 Claims. (Cl. 222—164)

The present invention relates generally to agricultural implements and more particularly to seeding implements, such as planters, especially those equipped with means for applying fertilizer along with the planting of the seed.

The object and general nature of the present invention is the provision of a new and improved planter for row crops. More specifically, it is a feature of this invention to provide a planting implement that includes a frame structure so constructed and arranged that the frame supports not only the planting mechanisms and associated parts but also fertilizer hoppers of greatly increased capacity, as compared with prior art devices. Additionally, it is a feature of this invention to provide a frame construction in which the fertilizer hoppers are disposed at the front of the implement and in a relatively low down position, whereby the hoppers may readily be filled by backing a truck up close to the hoppers and shoveling the fertilizer directly into the hoppers.

A further feature of this invention is the provision of a planter and fertilizer implement where in the fertilizer hoppers are also accessible from the rear of the machine. Specifically, the planting mechanisms, including the seed hoppers, are mounted in a relatively low position so that, for example, a truck may be backed at least partially over the seed hoppers from the rear of the machine and into a location convenient to filling the hoppers directly from the truck. A further advantage of having the fertilizer hoppers in a relatively low position is that where the filling is done from sacks, it is not necessary to lift the sacks very high in order to fill the fertilizer hoppers.

Another important feature of the present invention is the provision of a planter frame and fertilizer hopper construction in which the hoppers are in the form of transversely elongated containers swingably mounted on the front portion of the planter frame and so constructed and arranged that they may be swung downwardly and forwardly into a substantially 180° reversed position, whereby the contents of the fertilizer may be entirely emptied, as at the end of the day, and thus eliminate any tendency for the parts of the fertilizer dispensing means to become corroded, encrusted with hardened fertilizer, or the like, which would seriously interfere with the proper operation of the fertilizer dispensing mechanism when operations are resumed the following day.

These and other objects and advantages of the present invention will be apparent to those skilled in the art after a consideration of the following description of the preferred structure in which the principles of the present invention have been incorporated.

Figure 1:
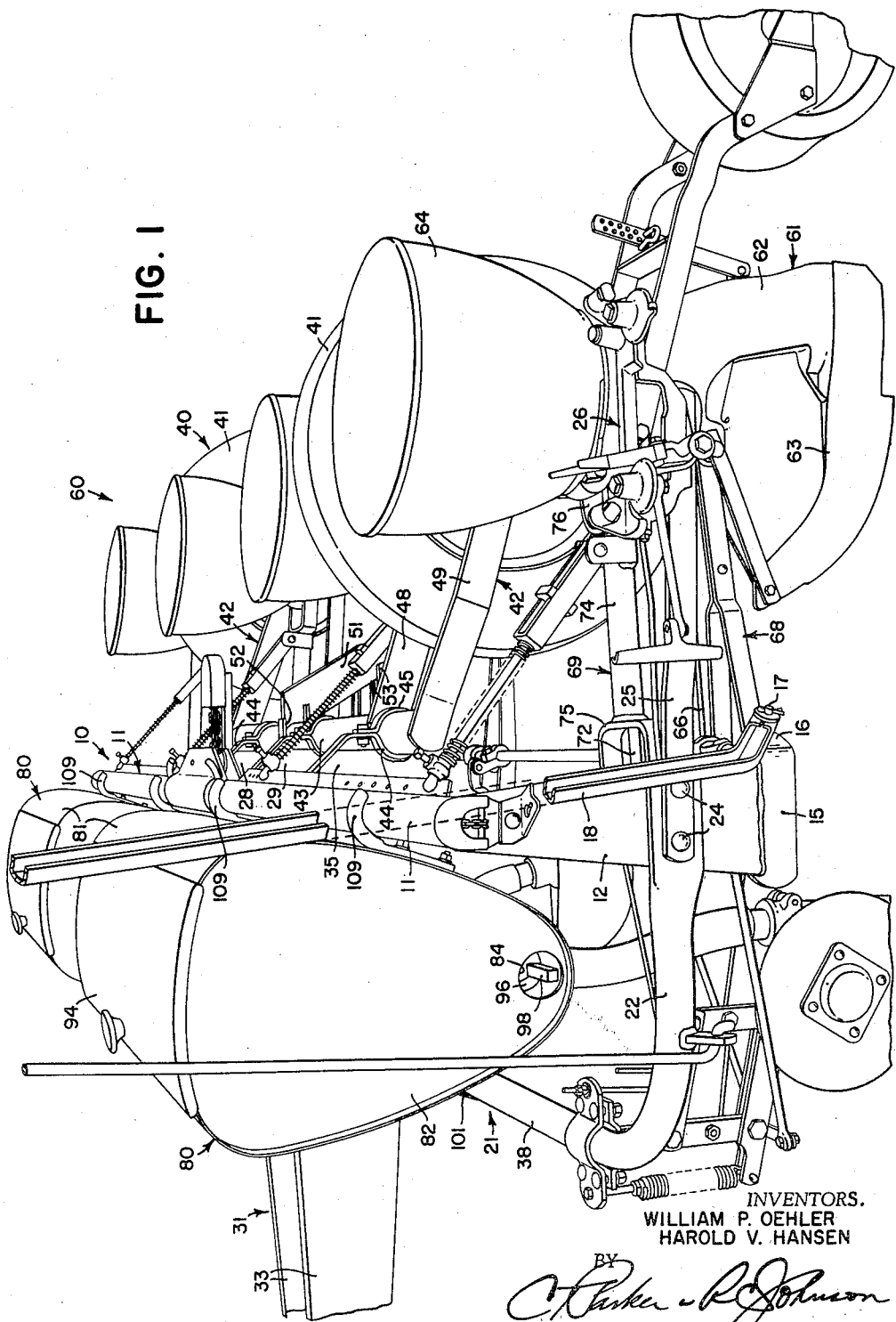
Fig. 1 is a perspective view of a four-row planting and fertilizer distributing implement in which the principles of the present invention have been incorporated.
Figure 3:
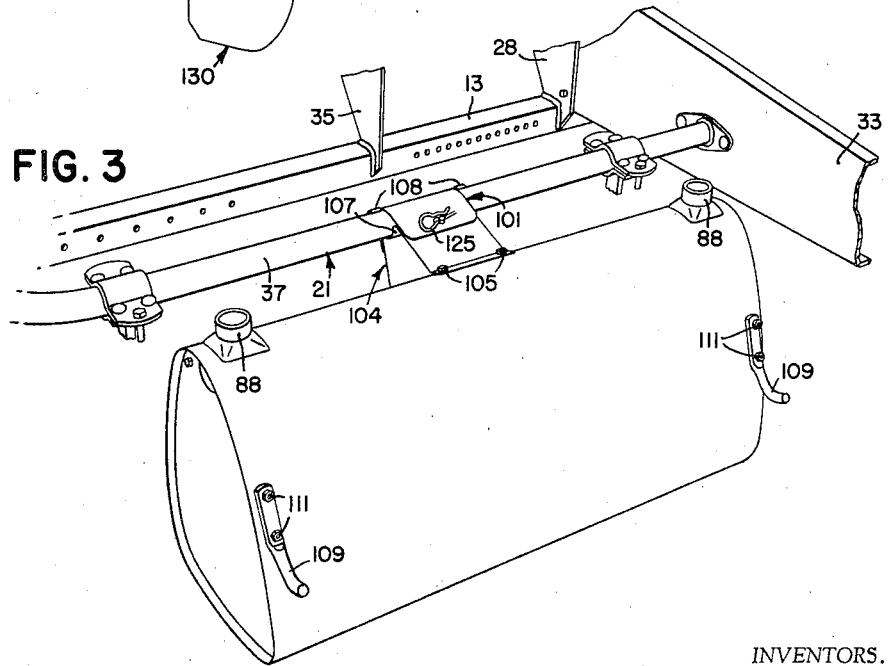
Fig. 3 is a fragmentary perspective view showing the fertilizer hopper in its inverted position.

The planter of the present invention, as best shown in Fig. 1, comprises a main frame 10 that is made up of an upper sill bar, preferably in the form of a pipe, shown at 11, a pair of vertical end sections 12, generally triangular in configuration and secured in any suitable way, as by welding, at their upper ends to the ends of the upper sill pipe 11. The frame 10 also includes a lower transverse frame member 13, preferably in the form of an angle that extends from one end to the other of the frame 10, each end being secured, as by welding, to the lower end of the associated end section 12 through a transverse part 15 that has one end 16 extended rearwardly and laterally inwardly, carrying a stud 17 that forms the bearing for the associated marker arm 18, only the lower portion of which is shown in Fig. 1. The part 15 is also securely fixed, as by welding, to the lower or base portion of the associated end section 12. The main frame 10 also includes a front pipe member 21 having its ends bent rearwardly, as indicated at 22, and flattened so as to fit against the outer face of the associated end section 12. The flattened section is apertured to receive a pair of attaching bolts 24 that also extend through apertures in the associated end section 12, and the bolts 24 also pass through the forward portion of an associated check head support bar 25 which at its rear end carries a check head 26 which is conventional, so far as the principles of the present invention are concerned, being constructed substantially like the check head shown in the U.S. Patent 2,315,752 which issued April 6, 1943 to Charles H. White. Other vertical members, such as those indicated at 28 and 29, Fig. 1, cooperate with the end sections and rigidly secure the lower sill angle 13 to the upper sill pipe member 11 to form a rigid structure. The frame 10 further includes a draft frame section 31 that includes a pair of forwardly extending generally vertically arranged plates 33, the rear ends of which are detachably secured in any suitable way to the intermediate vertical frame sections 28 and 29. The frame 10 also includes other intermediate vertical frame sections 35, as best shown in Fig. 3, to provide the desired rigidity in the frame 10. Preferably, the intermediate vertical sections 28, 29 and 35 are shaped to fit against the lower frame angle 13 and are welded thereto. Preferably, the forward pipe member 21 is made up of right and left hand sections 37 and 38, each having its laterally inner end suitably connected to the associated draft frame member 33, as by an apertured connecting plate 37ᵃ secured by bolts 38ᵃ to the associated draft frame plate 33.

The implement shown in Fig. 1 is in the nature of a towed planter, the forward ends (not shown) of the draft frame members 33 being connected by suitable hitch means with a farm tractor or other suitable propelling means. The main frame 10 is raised and lowered into and out of transport and operating positions by virtue of ground-engaging means 40 that includes a pair of ground wheels 41 carried on a pair of wheel arms 42 that are fixed at their upper and forward ends to a rockable shaft member 43, preferably in the form of a pipe, journaled in pairs of inner and outer bearing brackets 44 and associated bearing straps 45 suitably bolted together and secured, as by welding, to the associated vertical frame sections 28, 29 and 35. Each wheel arm 42 includes an inner member 48 and an outer member 49 receiving the associated wheel 41 therebetween and secured, as by welding, to the rockable pipe member 43, preferably with the outer bearing parts 44 and 45 disposed between the members 48 and 49. An actuating arm 51 is securely fixed as by welding at its upper end to the generally central portion of the rockable pipe member 43, the connection being reenforced by a U-shaped strap 52 also welded to the arm 51 and to the pipe member 43, and the lower end of the arm 51 is apertured to receive a pair of straps 53 or other suitable means forming a forwardly extending link connected or adapted to be connected to a suitable operating mechanism such as a hydraulic cylinder connected with, actuated by power derived from, and normally operated by means on the tractor for controlling implements. By virtue of such means, a force is exerted against the arm 51 to swing the wheel frame 42, 43, thus raising and lowering the implement as a unit relative to the ground.

The implement shown in Fig. 1 is provided with both seeding means and fertilizing means. The seeding means is indicated in its entirety by the reference numeral 60 and comprises a plurality of planting units 61, each including a generally vertically disposed shank casting 62 carrying at its lower end a furrow opening runner 63 and at its upper end a seed hopper 64 and associated seed-selecting and dispensing mechanism (not shown), which may be of any suitable construction, preferably like that shown, for example, in the U.S. Patent 2,340,163, issued January 24, 1944 to Charles H. White. As shown in the latter patent, such a planting unit includes suitable valve means operated by a link 66 (Fig. 1) that extends forwardly generally in parallelism with respect to lower link means 68 and upper link means 69 that connect each shank casting 62 with the associated frame 10. Preferably, the forward ends of the link members 68 and 69 are connected to an associated generally vertically disposed bracket 71 (Fig. 2) fastened in any suitable way to the lower sill angle 13 of the frame 10. There is, of course, one bracket 71 for each planting unit 61, and the construction generally is similar to that shown in U.S. Patent 2,376,464, issued May 22, 1945 to Charles H. White, and hence further description appears to be unnecessary except to point out that the several brackets 71 support a transversely extending drill shaft that is connected by suitable gearing to drive a seeding shaft 72 that extends rearwardly to the seed dispensing mechanism in each of the planting units 61. The upper link 69 is in the nature of a pipe 74 through which the associated seeding shaft 72 extends, with front and rear yokes 75 and 76 pivotally connected to the associated bracket 71 and the forward portion of the runner shank 62, respectively.

Figure 5:
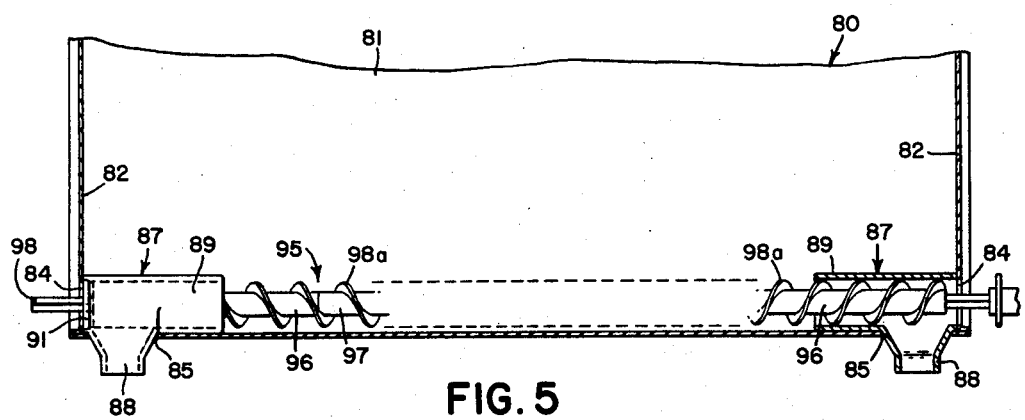
Fig. 5 is a sectional view through one of the hoppers, showing the fertilizer distributing auger and associated parts.

The fertilizer dispensing means incorporated in the present implement comprises a pair of transversely elongated fertilizer hoppers or containers 80. Each includes a hopper sheet 81 that is rolled to fit generally oval-like end plates 82. At the lower portion each end plate 82 of each hopper is provided with an opening 84, and closely adjacent each opening 84 the lower portion of the sheet 81 is provided with an opening 85, as best shown in Fig. 5. At each end of the hopper 80 the latter carries a fertilizer spout member 87, each member being in the form of a casting that includes a spout section 88, a cylindroidal section 89 and apertured attaching ears 91 that receive bolts 92 which fix the member 87 in position, with the spout sections 88 extending downwardly through the openings 85, respectively, and with the outer ends of the cylindrical sections 89 aligned with the openings 84 in the side plates 82 of the fertilizer hopper. Each hopper 80 is provided with an upper filler opening that extends from end to end and is closed by a suitable removable and reversible cover or closure 94.

Distributing means in the form of an auger 95 is disposed in the bottom of each hopper. The auger 95 comprises a plurality of right and left hand auger sections 96 and 97, preferably in the form of castings, and a shaft 98 that is square in cross section and extends through correspondingly formed openings in the auger castings 96 and 97. The latter are formed to have right and left hand threads or flights 98ª in the form of spirals, and the effective diameter of these portions substantially equal the internal diameter of the associated cylindrical spout sections 89, respectively. From Fig. 5 it will be observed that there are at least two or three turns of the auger spirals contained within each of the associated cylindrical sections 89, and that the augers 95 are supported substantially solely by the cylindrical sections 89. By having a plurality of turns of spiral sections disposed within the cylindrical sections, there is little possibility of fertilizer, no matter how free flowing, passing out through the spout sections 88 when the augers are not turning. Each shaft 98 is supported by its own auger castings.

Figure 2:
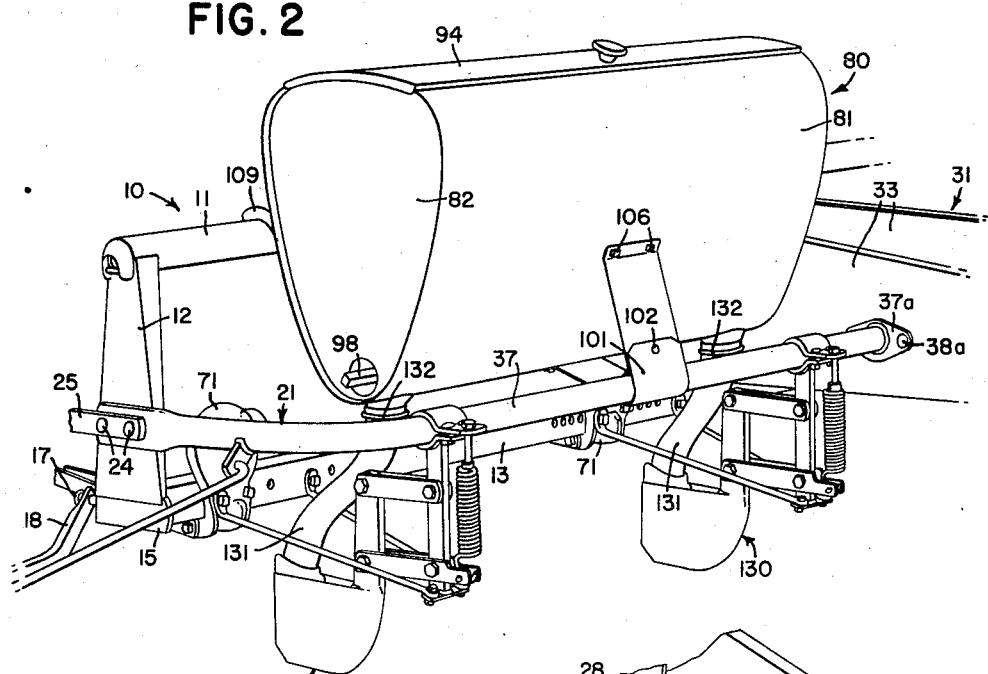
Fig. 2 is a fragmentary perspective view of one of the two fertilizer hoppers or containers and the associated frame structure and furrow openers.

From Fig. 1 it will be noted that there are two planter units disposed substantially directly behind one elongated fertilizer hopper 80. Each hopper is supported for forward and downward swinging movement from an operative or vertical position (Figs. 1 and 2), being swingably mounted on the transverse portion of the front frame pipe member 37, as best shown in Figs. 2 and 3. To this end, the associated frame member 37 constitutes fertilizer hopper supporting means connected rigidly between the associated end frame section 12 and the forwardly extending draft member 33. The means swingably connecting each hopper to the associated frame section 37 comprises a generally U-shaped yoke 101 shaped to snugly embrace the associated pipe section 37 and apertured to receive a pin or other connector, indicated at 102, that is carried by an associated bracket 104, also comprising a U-shaped part, the end portions of which are secured, as by bolts 105 and 106, to the body of the associated fertilizer hopper. From Fig. 3 it will be noticed that the pipe-engaging section 107 of the bracket 104 is curved so as to complement the U-shaped yoke 101 in rockably connecting the hopper to the frame member 37. Suitable means, such as a pair of blocks or stops 108 are provided on the frame member 37 and cooperate with the yoke 101 to hold the hopper against lateral shifting on the frame member 37. Hook members 109 are fixed, as by bolts 111, to the back side of the hopper 80 and, as best shown in Fig. 2, engage over the upper portion of the associated upper sill pipe 11 when the hopper is in its normal or vertical position, as shown in Figs. 1 and 2. By virtue of the means just described, the weight of the hopper and its contents is divided substantially equally between the frame members 11 and 21. Stops similar to those indicated at 108 may be placed on the frame pipe 11 for cooperation with the hook members 109.

As mentioned above, there are two hoppers 80 for the four planting units 60, and each hopper includes its own agitator and distributing means 95. The planting means 60 includes jackshaft means (not shown) that is driven in any suitable way from the ground wheels 41. The jackshaft drives various mechanisms of the implement, including the fertilizer distributing means 95. To this end, the jackshaft is arranged to actuate a drive chain 115 (Fig. 4) and the latter, in turn, is trained over a compound sprocket member 116 that is mounted on a centrally disposed drive shaft 117 supported by suitable bearing means 118 in the draft frame plate members 33. An end 119 of the drive shaft 117 extends laterally outwardly of each of the draft frame members 33 but, as indicated in dotted lines in Fig. 4, there is some clearance between each drive shaft end 119 and the associated fertilizer agitator shaft 98. The adjacent ends of each of the shaft sections are apertured, and a releasable drive connection is provided therebetween, which preferably is in the form of a loose sleeve 121 the ends of which are also apertured to receive pins 122 and 123 that connect the sleeve 121 with the respective shaft section 119 and 98. Since the sleeve 121 is loose on the associated shafts 98 and 119, some radial displacement of one of the shafts 98 and 119 relative to the other is accommodated. Preferably, one of the pins, such as the pin 123, is made quick-detachable, and by removing the pin 123, for example, the agitator shaft 98a, together with the augers 96 and 97 associated therewith, may be shifted axially outwardly a distance sufficient to move the shaft 98 out of connection with the associated sleeve 121. After this is done, the hopper may be swung downwardly from the position shown in Fig. 2 to the position shown in Fig. 3, as for the purpose of emptying out all of the fertilizer from the hopper when it is desirable so to do, as at the end of the day, or the like. Also, if desired, the pin 102 may be removed from the parts 101 and 104, to which end the inner end of the pin 102 is provided with a quick-detachable connector 125, after which the hopper is entirelely disconnected from the frame of the planter.

The implement 10 shown in Fig. 2 also includes a pair of runner type fertilizer furrow opening units 130, the details of mounting of which do not per se form any part of the present invention. It therefore suffices to note that fertilizer from the hopper 80 is delivered to the units 130 through a pair of flexible conduits 131 and that the upper end of each of the conduits 131 is releasably connected with the spout sections 88 by a quick-detachable spring ring member 132. It is, of course, necessary to disconnect the conduits 131 before inverting the hopper 80. When planting under trashy conditions disk type furrow opener may be used, as shown in Fig. 1.

Figure 4:
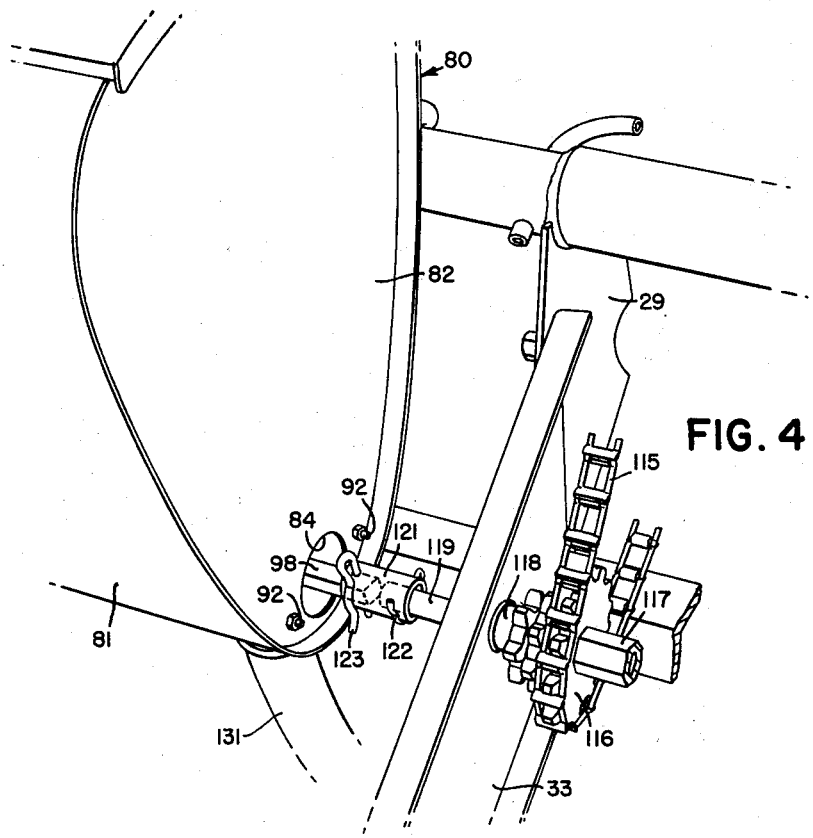
Fig. 4 is an enlarged fragmentary perspective view showing the preferred form of detachable drive connecting means, by which the distributing auger in each fertilizer hopper is driven.

It will be noted from Fig. 4 that in the event that it is impossible or undesirable to shift the auger unit 95 axially outwardly to disconnect the same from the sleeve 121, both pins 122 and 123 may be disconnected from the sleeve 121 and the latter shifted axially inwardly along the associated shaft end 119, whereupon the hopper may be inverted without requiring any outward movement of the associated auger unit 95.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In an agricultural implement, a frame including upper and lower fore-and-aft spaced apart transverse bars, a hopper having a filler opening, the lower bar being round in section, means hingedly connecting the lower portion of said hopper to the lower of said transverse frame bars to provide for substantially 180° inversion of said hopper, to facilitate discharge of all fertilizer from the hopper through said filler opening, when the hopper is swung away from and downwardly relative to the upper transverse frame bar, the lower portion of said hopper being closed and said hinged connecting means comprising a bracket having one portion connected with the forward side of said hopper, a second portion connected to the closed bottom portion of said hopper, and a central portion curved inwardly to embrace the adjacent side of said lower bar, and a generally U-shaped yoke embracing the other side of said lower bar and removably fixed to said bracket, the latter and said yoke surrounding said lower bar and rockable thereon to accommodate said hopper inversion, and bracket means fixed to the side of the hopper opposite said adjacent side and adjacent the upper portion of the hopper so as to engage over said upper frame bar when the hopper is raised into a material-retaining position for supporting a portion of the weight of the hopper and contents on the upper bar.

2. In an agricultural implement, a frame including upper and lower fore-and-aft spaced apart transverse bars, an elongated hopper having a closed bottom, generally centrally located means hingedly connecting the lower portion of said hopper to the lower of said transverse frame bars, said hinged connecting means including a bracket having two generally vertically spaced apart attaching sections, one connected with the closed bottom of the hopper and the other connected with one side of the hopper, and said bracket also including a part embracing said lower bar, said bracket and bar being so constructed and arranged as to accommodate hinging movement of said hopper relative to said lower bar, and a pair of spaced apart upper bar embracing means on said hopper at the other side thereof and located thereon in spaced apart relation longitudinally of the hopper and serving to hold the hopper in an upright position.

3. In an agricultural implement, a frame including upper and lower fore-and-aft spaced apart transverse bars, a hopper, means hingedly connecting the lower portion of said hopper to the lower of said transverse frame bars, including a part embracing said lower bar and connected with said hopper, and upper bar embracing means on the upper portion of said hopper at one side thereof to hold the hopper in an upright position, said lower bar comprising a member substantially round in cross section, said bar-embracing part including a curved section snugly interfitting with said lower bar and said hopper bracket also including a curved section interfitting with said member, portions of said bar-embracing part overlapping portions of said bracket, said overlapping portions being apertured, and a detachable connector extending through said apertures.

4. In an agricultural implement, a frame, a fertilizer hopper having a lower portion including a pair of spaced apart cylindrical sections, a screw type auger disposed within said sections and including generally helical flights contacting said sections and cooperating with the latter to serve as the sole support for said auger in the hopper, said auger being removable axially from said sections, a drive shaft carried by said frame in approximate alignment with one end of said auger, a drive sleeve loosely engaging said auger and said drive shaft, disconnectible means drivingly connecting said auger and drive sleeve with said drive shaft means swingably connecting said hopper with said frame to carry said hopper into and out of alignment with said drive shaft, and said drive sleeve, when disconnected, accommodating axially outward removal of the auger from the hopper thereby accommodating swinging of said hopper relative to the drive shaft into a dumping position.

5. In an agricultural implement, frame means, a fertilizer hopper comprising a container having a rounded bottom provided with one or more outlets, means swingably supporting the hopper on said frame means, an auger distributor disposed along the bottom of said hopper, means in the bottom of the hopper forming cylindroidal sections receiving said auger distributor and supporting the latter solely by contact of the flights of said auger distributor with said cylindroidal sections, and drive means for said auger including a pair of axially spaced apart shafts arranged with a space therebetween, and means yieldable in generally radial relation and including a sleeve loosely embracing the adjacent shaft ends with clearance around the shaft ends, and means connecting the sleeve to each shaft end.

References Cited in the file of this patent

UNITED STATES PATENTS

| 760,442 | Fry | May 24, 1904 |
| 860,610 | Sester | July 16, 1907 |
| 2,319,758 | White | May 18, 1943 |
| 2,337,749 | Hand | Dec. 28, 1943 |
| 2,436,132 | White | Feb. 17, 1948 |
| 2,626,579 | Shaw | Jan. 27, 1953 |
| 2,656,073 | Buhr | Oct. 20, 1953 |
| 2,656,951 | Murphy | Oct. 27, 1953 |

FOREIGN PATENTS

| 4,078 | Great Britain | of 1886 |
| 27,258 | Sweden | June 27, 1908 |